(No Model.)
J. C. GOULD.
MOUSE TRAP.
No. 280,369. Patented July 3, 1883.
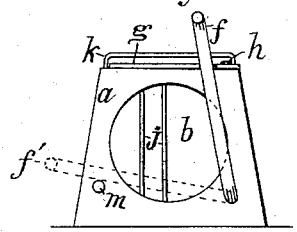
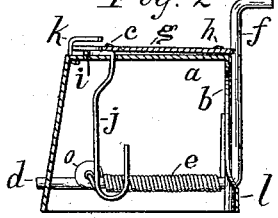
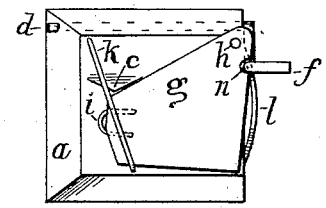
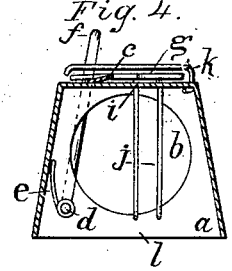
Witnesses:
Stephen A. Douglas
Inventor:
John C. Gould.
By Wm Zimmerman,
Atty.

UNITED STATES PATENT OFFICE.

JOHN C. GOULD, OF CHICAGO, ILLINOIS.

MOUSE-TRAP.

SPECIFICATION forming part of Letters Patent No. 280,369, dated July 3, 1883.

Application filed December 10, 1881. Renewed December 29, 1882. (No model.)

*To all whom it may concern:*

Be it known that I, JOHN C. GOULD, of Chicago, in the county of Cook and State of Illinois, have invented certain new and useful Improvements in Mouse and other Traps; and I hereby declare the following to be a full, clear, and exact description thereof, which will enable others skilled in the art to which my invention relates to make and use the same, reference being had to the accompanying drawings, forming a part hereof, and in which—

Figure 1 represents a front elevation. Fig. 2 represents a vertical longitudinal section. Fig. 3 represents a plan view; and Fig. 4 rep15 resents an elevation viewed from the rear, with the rear wall of the trap removed. Each view represents the trap set.

Like letters of reference indicate like parts.

In the drawings, $a$ represents a sheet-metal box, made in the form of a truncated pyramid on three of its sides, the fourth side being made vertical and provided with an opening, $b$. The part $l$, below said opening, is bent outward, as shown. The rim $l$ resists the press25 ure of the lever $f$, so that anything caught is firmly held between it and the lever $f$. A right-angled cut is made in the top and near one of the rear corners, and the metal bent upward so as to form a stop, $c$. Through the top, near the stop $c$, is passed a baiting-hook, which is formed of two hooks, $j$, which hang near the rear wall of the interior of the trap, and which are united by a horseshoe-shaped curve, $i$, bent at right angles to the plane of the hooks $j$, and so as to lie flat upon the top of the box $a$. Near the bottom, and close to and parallel to one of the sides, is passed through the box a stout wire, $d$, wound with a spiral spring, $e$, attached to a loop, $o$, and its free end attached to the box $a$. After the wire $d$ passes out through the front of the box, it is bent at right angles so as to form a lever, $f$, of which the outer end is again bent parallel to the shaft $d$, so as to form a handle to the lever $f$. To the top of the box is loosely pivoted at $h$ a truncated right-angled-triangle plate or lever, $g$, which is provided near the pin $h$ with a notch, $n$. Over the truncated end of said triangular lever $g$ is fastened to the box $a$ a staple, $k$, allowing sufficient lateral as well as upward play of the free end thereof. In place of the staple $k$, the top of the box may be cut and the part lying between the cut and back wall raised, so that the free end of the lever $g$ may play under it as under the staple. The action of the spring $e$ and the shaft $d$ tends to turn it so as to throw the lever $f$ into the position $f'$, where it is caught and held by a stop, $m$.

To set the trap, the lever $f$ is raised so that the notch $n$ may catch it when the lever $g$ is turned forward on its pivot, $h$, and they are held in place by the catch or stop $c$, which rises just high enough so that the inclined side of the lever $g$ will lie against one of its sides parallel thereto. A very slight inward pressure against the hooks $j$ will cause the horseshoe-shaped connecting part to rise at its outer end, or, by an inward pull, rest the outer end of the part $i$ and raise its heels and baiting-hooks upward, and thereby lift the lever $g$ above the stop $c$, and thus release it, and thereby the lever $f$, which will by the action of the spring $e$ be thrown into the position $f'$ and the lever $g$ back over the stop $c$. The pin $h$ and notch $n$ are necessarily placed at more or less of an angle with each other relative to the plane of motion of the lever $f$, and consequently by the motion of the lever $g$ the lever $f$ will be released from the notch $n$.

The box $a$ is not absolutely necessary, as three of its sides might be removed, leaving the fourth side, or only a part thereof, to support the flat top, to support the lever $g$, stop $c$, and baiting-hook; and the lever $f$ may be formed into a curve, so as to connect with the other end of the shaft $d$, and thereby guard the three open sides mentioned.

What I claim as new is—

1. In an animal-trap, the shaft $d$, provided with lever $f$ and spring $e$, in combination with rim $l$ and lever $g$, provided with notch $n$, and pivoted at $h$, stop $c$, and baiting-hook $j\,i$, all constructed substantially as and for the purpose specified.

2. In an animal-trap whereof the body $a$ has a vertical side provided with an opening, $b$, and whereof the part $l$ is convexed outward, as shown, and is provided with a shaft, $d$, and spring $e$, actuating a lever, $f$, operating in a plane parallel to and near the side having the opening b, in combination with the lever g, stop c, lever i j, and staple k, substantially as specified.

3. An animal-trap whereof the body a, formed in the shape of a truncated pyramid, has a side provided with an opening, b, and whereof the part l is convexed, as shown, and is provided with a shaft, d, and spring e, actuating a lever, f, which operates in a plane parallel to and near the side having the opening b, in combination with the lever g, stop c, lever i j, staple k, and stop m, substantially as specified.

JOHN C. GOULD.

Witnesses:
WILLIAM ZIMMERMAN,
W. H. JAYNE.